(12) United States Patent
Kuwata et al.

(10) Patent No.: US 9,115,256 B2
(45) Date of Patent: Aug. 25, 2015

(54) POLYAMIDE FILM COATED WITH VINYLIDENE CHLORIDE COPOLYMER MIXTURE AND METHOD FOR PRODUCING THE SAME

(75) Inventors: Hideki Kuwata, Kyoto (JP); Takayoshi Okuzu, Kyoto (JP)

(73) Assignee: UNITIKA LTD., Hyogo (JP)

( * ) Notice: Subject to any disclaimer, the term of this patent is extended or adjusted under 35 U.S.C. 154(b) by 0 days.

(21) Appl. No.: 12/743,724

(22) PCT Filed: Nov. 28, 2008

(86) PCT No.: PCT/JP2008/003507
§ 371 (c)(1),
(2), (4) Date: May 19, 2010

(87) PCT Pub. No.: WO2009/069307
PCT Pub. Date: Jun. 4, 2009

(65) Prior Publication Data
US 2010/0279110 A1 Nov. 4, 2010

(30) Foreign Application Priority Data

Nov. 30, 2007 (JP) .................................. 2007-310147

(51) Int. Cl.
| C08J 7/04 | (2006.01) |
| B32B 27/08 | (2006.01) |
| B32B 27/32 | (2006.01) |
| B32B 27/34 | (2006.01) |

(52) U.S. Cl.
CPC ................. *C08J 7/047* (2013.01); *B32B 27/08* (2013.01); *B32B 27/32* (2013.01); *B32B 27/34* (2013.01); *C08J 2377/00* (2013.01); *C08J 2427/00* (2013.01); *Y10T 428/2817* (2015.01); *Y10T 428/3175* (2015.04)

(58) Field of Classification Search
CPC ........ B32B 27/08; B32B 27/32; B32B 27/34; C08J 2377/00; C08J 2427/00; C08J 7/047; Y10T 428/2817; Y10T 428/3175
See application file for complete search history.

(56) References Cited

U.S. PATENT DOCUMENTS

| 3,108,017 | A | * | 10/1963 | Messwarb et al. ............. 427/230 |
| 3,539,439 | A | * | 11/1970 | Calderwood et al. ......... 428/214 |
| 3,922,451 | A | * | 11/1975 | Anschutz et al. ............ 428/36.6 |
| 4,431,705 | A | * | 2/1984 | Kitagawa et al. .......... 428/476.1 |
| 4,438,180 | A | | 3/1984 | Lang et al. |
| 4,543,387 | A | * | 9/1985 | Padget et al. ................. 524/523 |
| 4,694,068 | A | * | 9/1987 | DeLassus et al. ............. 528/503 |
| 4,755,402 | A | * | 7/1988 | Oberle ......................... 428/34.9 |
| 5,446,101 | A | * | 8/1995 | Anazawa et al. ............. 525/239 |

FOREIGN PATENT DOCUMENTS

| CA | 1222086 | 5/1987 | |
| CN | 1215739 | 5/1999 | |
| EP | 0 062 800 | 10/1982 | |
| EP | 405933 A2 * | 1/1991 | .............. B32B 27/00 |
| EP | 1 728 816 | 12/2006 | |
| EP | 1 770 116 | 4/2007 | |
| EP | 2 098 560 | 9/2009 | |
| JP | 57057741 A * | 4/1982 | |
| JP | 57141443 A * | 9/1982 | |
| JP | 60-250041 | 12/1985 | |
| JP | 04-147857 | 5/1992 | |
| JP | 06-220284 | 8/1994 | |
| JP | 09-052326 | 2/1997 | |
| JP | 2000-301604 | 10/2000 | |
| JP | 2001-315281 | 11/2001 | |
| JP | 2002-220504 | 8/2002 | |
| JP | 2006-015743 | 1/2006 | |

OTHER PUBLICATIONS

Machine translation of JP 2000-301604 (2011).*
DOW Plastics "Vinylidene Chloride Monomer and Polymers: A Technical Report on VDC and PVDC". p. 882-923. Published Dec. 2000.*
Model for the Solid-Liquid Phase Transitions (Melting) of Undiluted Random Semicrystalline Copolymers of Vinylidene Chloride with Methyl Acrylate Monomers Bernard E. Obi, Phillip DeLassus, and Eric A. Grulke Macromolecules 1994 27 (19), 5491-5497.*
Derwent abstract of JP 57-057741 (1990).*
Derwent abstract of JP 57-141443 (1985).*
Machine translation of JP 57-057741 (1982).*
Machine translation of JP 57-141443 (1982).*
Taiwanese Office Action dated Jul. 4, 2013.
Chinese Office Action in application No. 200880118416.6 dated Jan. 6, 2014.
Canadian Office Action in application No. 2,706,024 dated Feb. 3, 2015.

\* cited by examiner

*Primary Examiner* — Callie Shosho
*Assistant Examiner* — John Freeman
(74) *Attorney, Agent, or Firm* — Fildes & Outland, P.C.

(57) ABSTRACT

Disclosed is a polyamide film coated with a vinylidene chloride copolymer mixture, wherein: on at least one side of a biaxially stretched polyamide film, a vinylidene chloride copolymer mixture layer in which no thermal crosslinking agent is copolymerized is formed by coating without through an intermediary of a primer layer; the vinylidene chloride copolymer mixture is a mixture including two or more vinylidene chloride copolymers; and one of the vinylidene chloride copolymers has a crystal melting point of 170° C. or higher and 210° C. or lower and is contained in an amount of 25 to 45 parts by mass in relation to 100 parts by mass of the vinylidene chloride copolymer mixture.

1 Claim, No Drawings

POLYAMIDE FILM COATED WITH VINYLIDENE CHLORIDE COPOLYMER MIXTURE AND METHOD FOR PRODUCING THE SAME

TECHNICAL FIELD

The present invention relates to a polyamide film coated with a vinylidene chloride copolymer mixture and a method for producing the same.

BACKGROUND ART

Vinylidene chloride copolymers are widely used as films for use in food packaging and in industries because of the excellent gas-barrier property of the coating films formed with vinylidene chloride copolymers.

The coating film of a vinylidene chloride copolymer is formed by applying a latex to a plastic film (hereinafter referred to as a "substrate film") to serve as a substrate. In general, however, a vinylidene chloride copolymer latex has an insufficient adhesion to a substrate film. Accordingly, an attempt has been made to enhance the adhesion of a substrate film to a vinylidene chloride copolymer latex by achieving the surface modification of the substrate film by applying to the substrate film a physical treatment such as a corona discharge treatment or a plasma treatment, or alternatively a chemical treatment which activates the film surface by using a chemical such as an acid or an alkali. However, a method based on a physical treatment is simple in the operation steps involved, but achieves insufficient adhesion. A method based on a chemical treatment is disadvantageously complicated in the operation steps involved and aggravates the work environment and others.

In addition to the above-described physical and chemical methods, there is a method in which a primer coating agent having an adhesion activity is applied to the substrate film so as to laminate an easy-adhesion coating film (hereinafter referred to as a "primer layer"). This method is widely used, for example, because this method permits the selection of a primer component according to various vinylidene chloride copolymer latexes (JP08-238728A). However, although the method involving the primer layer ensures adhesiveness, this method requires at least one extra operation step and leaves room for improvement with respect to the complexity of the operation steps and the cost.

JP62-256871A has proposed an improvement of the adhesion between the vinylidene chloride copolymer and a printing ink on the basis of, for example, the introduction of a nitrile group into the vinylidene chloride copolymer. JP08-239536A has proposed an improvement of the adhesion between the vinylidene chloride copolymer and a release agent on the basis of, for example, the introduction of a hydroxyl group into the vinylidene chloride copolymer. However, any of these proposals offers an insufficient adhesion to the substrate film, in particular, the substrate film free from application of a surface modification treatment.

From the viewpoint of enhancing the gas-barrier property of the formed coating film, widely used is a so-called precoating method in which a substrate film before completion of orientation crystallization is coated with a vinylidene chloride copolymer latex, and subsequently the coated substrate film is treated with a high amount of heat at the time of film stretching (JP58-158247A). However, the latex coating film fusion-bonded at a high temperature by the precoating method is in a condition of being soft at the time of winding-up immediately after the film formation. Therefore, when a contact pressure is exerted between the coating film and the abutting non-coated surface of the substrate film due to, for example, the roll contraction phenomenon of the film roll caused by the passage of time, a blocking phenomenon may occur. In such a case, when the film is unwound from the winding roll, the surface of the coated film is roughened, and the loss of the optical uniformity of the coated film (brushing phenomenon) may happen, although with a low probability.

JP59-093324A has proposed a method for overcoming the brushing phenomenon by regulating the aging condition in the state of being wound, subsequent to the film formation. However, this method suffers from a non-simple control program for an aging chamber and leaves room for improvement also with respect to the process management and the continuous operation.

JP58-176235A and JP61-167528A have proposed the vinylidene chloride copolymer latexes in each of which a crosslinking agent having an epoxy group is copolymerized. In these cases, although the use of such a latex achieves a brushing resistance of the coating film, the resin coating film of the vinylidene chloride copolymer is crosslinked to a high degree by the high amount of heat at the time of film stretching, and consequently, the elasticity or the adhesion to the substrate film may be degraded to a slight extent, although with a low probability.

JP58-7664B and JP56-005844A have proposed the latexes in each of which a small amount of a highly crystalline vinylidene chloride polymer is mixed. However, although the use of such a latex achieves a brushing resistance, the following new problems are caused due to the high crystallinity of the vinylidene chloride polymer: the addition of such a vinylidene chloride polymer in a predetermined or larger amount causes the fusion bonding failure of the mixed latex to degrade the gas-barrier property, and makes the coating film highly rigid to aggravate the adhesion to the thermoplastic substrate film. Thus, the above-described mixed latexes are far from satisfying all the performances.

In recent years, the demanded properties required for films have been elevated due to the diversification of the packaging styles and packaging applications. In particular, with respect to the items such as the adhesion between the substrate film and the coating layer, the brushing resistance, the gas-barrier property, the boiling heat-treatment resistance, the involved cost and the simplification of the involved operation steps, the requirements are beyond comparison more severe than before, and of course, all the demanded properties should be satisfied simultaneously.

DISCLOSURE OF THE INVENTION

Problems to be Solved by the Invention

The present invention provides a polyamide film coated with a vinylidene chloride copolymer mixture having excellent performances with respect to the adhesion between the substrate film and the coating layer, the brushing resistance, the gas-barrier property and the boiling heat-treatment resistance.

Means for Solving the Problems

The present inventors performed a diligent study by focusing attention on the composition of the vinylidene chloride copolymer to be used as a coating film and the technique for film stretching and film coating, and consequently discovered that controlling of both of the above-described composition and technique improves the performances of the coating film, and accordingly improves the properties such as the adhesion between the substrate film and the coating layer, the brushing resistance, the gas-barrier property and the boiling heat-treatment resistance.

Specifically, the features of the present invention are as follows.

(1) A polyamide film coated with a vinylidene chloride copolymer mixture, wherein: on at least one side of a biaxially stretched polyamide film, a vinylidene chloride copolymer mixture layer in which no thermal crosslinking agent is copolymerized is formed by coating without through the intermediary of a primer layer; the vinylidene chloride copolymer mixture is a mixture including two or more vinylidene chloride copolymers; and one of the vinylidene chloride copolymers has a crystal melting point of 170° C. or higher and 210° C. or lower and is contained in an amount of 25 to 45 parts by mass in relation to 100 parts by mass of the vinylidene chloride copolymer mixture.

(2) The polyamide film coated with a vinylidene chloride copolymer mixture according to (1), wherein the inter-layer adhesive strength between the polyamide film and the vinylidene chloride copolymer mixture layer is 2 N/cm or more both in the ordinary state and after a hot water treatment at 95° C. for 30 minutes.

(3) A laminate, wherein on the vinylidene chloride copolymer mixture layer in the polyamide film coated with the vinylidene chloride copolymer mixture according to above-described (1) or (2), an adhesive layer and a heat sealing layer are laminated in this order, directly or through the intermediary of a printing ink layer disposed in contact with the vinylidene chloride copolymer mixture layer.

(4) A method for producing a polyamide film coated with a vinylidene chloride copolymer mixture, the method being a method for producing the polyamide film according to above-described (1) or (2), wherein a heat fixation treatment is performed in a temperature range from 150 to 250° C., after an unstretched polyamide film is coated with a latex of the vinylidene chloride copolymer mixture and then biaxially stretched, or after a polyamide film uniaxially stretched in a first direction is coated with the latex and then uniaxially stretched in a second direction perpendicular to the first direction.

(5) The method for producing a polyamide film coated with a vinylidene chloride copolymer mixture according to (4), wherein the temperature of the heat fixation treatment is a temperature of [(the crystal melting point of the vinylidene chloride copolymer having a crystal melting point of 170° C. or higher and 210° C. or lower)+50° C.] or lower.

(6) A method for producing a polyamide film coated with a vinylidene chloride copolymer mixture, the method being a method for producing the polyamide film according to above-described (1) or (2), wherein an unstretched polyamide film is coated with a latex of a vinylidene chloride copolymer mixture, then the water content of the unstretched polyamide film is regulated to be 2 to 10% by mass and the degree of crystallization of the unstretched polyamide film is regulated to be 30% or less, and then a biaxial stretching is performed.

Advantages of the Invention

According to the present invention, there can be obtained a biaxially stretched polyamide film coated with a vinylidene chloride copolymer mixture having excellent performances with respect to all of the adhesion between the substrate film and the coating layer, the brushing resistance, the gas-barrier property and the boiling heat-treatment resistance. In particular, the adhesion between the biaxially stretched polyamide film as the substrate layer and the vinylidene chloride copolymer mixture layer as the coating layer is excellent, and hence the vinylidene chloride copolymer mixture layer can be formed by coating on the biaxially stretched polyamide film even without through the intermediary of a primer layer. Consequently, the above-described film having satisfactory performances can be obtained. Owing to the fact that the adhesion between the substrate film and the coating layer is improved, when bags having laminate configurations are produced by using this film, the resistance against falling or the like is remarkably improved, and accordingly large merits are obtained with respect to the distribution such as transportation. The coating layer exhibits a satisfactory adhesiveness to printing inks, adhesives, polyolefin resins and the like, and such an adhesiveness is maintained even after a boiling hot water treatment. Additionally, even under a contact pressure, for example, at the time of the winding-up immediately after the film formation, no blocking occurs between the non-coated surface of the substrate film in mutual contact with the coating layer and the concerned coating layer. Consequently, the optical uniformity of the film is not lost, and hence extremely large merits are obtained from the viewpoints of the design features in packaging applications and the safety permitting checking the contents in packaging applications. The film of the present invention as described above can be preferably used as packaging materials, electrical insulating materials, general industrial materials and others.

BEST MODE FOR CARRYING OUT THE INVENTION

Hereinafter, the present invention is described in detail.

The biaxially stretched polyamide film as the substrate film in the present invention is a film oriented by stretching biaxially, longitudinally and transversely, an unstretched polyamide resin sheet melt-extruded from an extrusion die according to an extrusion method. The biaxially stretched polyamide film may be a film constituted with a single layer, or a film constituted with a plurality of layers formed by simultaneous melt extrusion or by lamination.

Examples of the polyamide resin constituting the biaxially stretched polyamide film include nylon 6, nylon 66, nylon 46, nylon 69, nylon 610, nylon 612, nylon 11, nylon 12 and polymetaxylylene adipamide (nylon MXD6), and mixtures, copolymers and composites of these. Particularly preferable is nylon 6 excellent in cost performance, from the viewpoints of the productivity and the performances.

The relative viscosity of the polyamide resin constituting the film is not particularly limited; however, the relative viscosity measured under the conditions that 96% sulfuric acid is used as a solvent, the temperature is 25° C. and the concentration is 1 g/dl is preferably in the range from 1.5 to 5.0, more preferably from 2.5 to 4.5 and furthermore preferably from 3.0 to 4.0. When the relative viscosity of the polyamide resin is less than 1.5, the mechanical properties of the film tend to be remarkably degraded. When the relative viscosity of the polyamide resin exceeds 5.0, the film formability tends to be disturbed.

To the polyamide resin, where needed, one or two or more of additives such as a pigment, an antioxidant, an antistatic agent, an ultraviolet absorber, a lubricant and a preservative agent may be added. Appropriately, the mixing amounts of these additives are in a range from 0.001 to 5.0 parts by mass in terms of the total amount per 100 parts by mass of the resin.

With the polyamide resin, a reinforcing material may be mixed for the purpose of ensuring the strength when the film is used as packaging materials or the like. Examples of the reinforcing material include: fibrous reinforcing materials such as glass fiber, aromatic polyamide fiber, carbon fiber, pulp and cotton linter; powdery reinforcing materials such as carbon black and white carbon; and flaky reinforcing materials such as glass flake and aluminum flake. These may be used each alone or in combinations of two or more thereof. Appropriately, the mixing amounts of the reinforcing materials are 2 to 150 parts by mass in terms of the total amount per 100 parts by mass of the resin.

Further, with the polyamide resin, for example, for the purpose of bulking the resin, the following fillers may be mixed: heavy or soft calcium carbonate, mica, talc, kaolin, gypsum, clay, barium sulfate, alumina powder, silica powder and magnesium carbonate. One or two or more of these fillers may be used, appropriately in an amount of 5 to 100 parts by mass in terms of the total amount per 100 parts by mass of the resin.

Further with the polyamide resin, for example, for the purpose of improving the gas-barrier property, scale-like inorganic fine powders such as water swellable mica and may be mixed. Appropriately, the mixing amounts of the scale-like inorganic fine powders are 5 to 100 parts by mass in terms of the total amount per 100 parts by mass of the resin.

The thickness of the biaxially stretched polyamide film is not particularly limited; the film thickness is usually 5 to 150 μm, preferably 7 to 50 μm and more preferably 10 to 35 μm. When the film thickness is less than 5 μm, the film strength may be degraded, and the handleability in the printing or laminating step or the like also tends to be degraded. When the film thickness exceeds 150 μm, the flexibility tends to be degraded and the disadvantage with respect to the cost tends to be caused.

In the present invention, the vinylidene chloride copolymer mixture used for the coating layer is a mixture including two or more vinylidene chloride copolymers.

A vinylidene chloride copolymer is obtained as a latex dispersed in a medium by polymerizing, with a known emulsion polymerization method, 50 to 99% by mass of vinylidene chloride as a starting material and 1 to 50% by mass of one or more other monomers copolymerizable with vinylidene chloride. When the copolymerizable monomer proportion is less than 1% by mass, the interior of the resin is plasticized insufficiently to degrade the film formability of the coating film, and when the copolymerizable monomer proportion exceeds 50% by mass, the gas-barrier property is degraded. The higher is the proportion of vinylidene chloride, a vinylidene chloride copolymer having the higher crystal melting point is obtained.

Examples of the monomer copolymerizable with vinylidene chloride include: vinyl chloride; acrylic acid esters such as methyl acrylate, ethyl acrylate, butyl acrylate, 2-ethylhexyl acrylate and 2-hydroxyethyl acrylate; methacrylic acid esters such as methyl methacrylate and glycidyl methacrylate; acrylonitrile and methacrylonitrile; and unsaturated carboxylic acids such as acrylic acid, methacrylic acid, itaconic acid and maleic acid. One or two or more of these monomers can be selected to be used.

One of the vinylidene chloride copolymers in the vinylidene chloride copolymer mixture is added mainly for the purpose of improving the brushing resistance, and is required to be the copolymer exhibiting the highest crystal melting point in the two or more vinylidene chloride copolymers constituting the vinylidene chloride copolymer mixture. The crystal melting point is required to be 170° C. or higher and 210° C. or lower, and is more preferably in a range of 180° C. or higher and 210° C. or lower. When the crystal melting point of this specific vinylidene chloride copolymer exceeds 210° C., the melt fusion bonding property of the coating film and the gas-barrier property are degraded. When the crystal melting point of this specific vinylidene chloride copolymer is lower than 170° C., the crystal nuclei of the vinylidene chloride copolymer latex, formed by this vinylidene chloride copolymer, are almost melted, and hence the brushing resistance effect is made poor. Additionally, the crystal melting point of this vinylidene chloride copolymer is preferably equal to or lower than the maximum heat-treatment temperature in the film stretching production step.

As described above, the higher is the proportion of vinylidene chloride, a vinylidene chloride copolymer having the higher crystal melting point is obtained, and hence the vinylidene chloride copolymer having a melting point of 170° C. or higher and 210° C. or lower is preferably a copolymer obtained by a polymerization with the proportion of vinylidene chloride being close to the above-described upper limit, for example, with the proportion of vinylidene chloride falling in a range from 95 to 99% by mass. On the other hand, the other vinylidene chloride copolymer or copolymers to be mixed with the vinylidene chloride copolymer having a melting point of 170° C. or higher and 210° C. or lower are required to be capable of forming a continuous coating film under the film production conditions, and hence are unpreferably high in the proportion of vinylidene chloride; usually, copolymers having a proportion of vinylidene chloride of 80 to 95% by mass can be preferably used.

The proportion of the vinylidene chloride copolymer having a crystal melting point of 170° C. or higher and 210° C. or lower is required to be 25 to 45 parts by mass and is preferably 35 to 45 parts by mass in relation to 100 parts by mass of the vinylidene chloride copolymer mixture. When this proportion is less than 25 parts by mass, the brushing resistance effect is made poor, and when this proportion exceeds 45 parts by mass, the film formability of the coating film is degraded to degrade the gas-barrier property.

The vinylidene chloride copolymer mixture may be used in combination with one or more other resins. Examples of the other resins include: ethylene-vinyl acetate copolymer, (meth)acrylic acid ester copolymers, methyl methacrylate-butadiene-styrene copolymer, acrylonitrile copolymer and methyl vinyl ether-maleic acid anhydride copolymer. One or two or more of these resins can be selected to be used.

The vinylidene chloride copolymer mixture is required to be free from the copolymerization with a so-called thermal crosslinking agent that undergoes no reaction at room temperature but undergoes progress of crosslinking reaction due to high heat, generally due to a high temperature of 100° C. or higher. It is to be noted that a thermal crosslinking agent deserves to be referred to as a thermal crosslinking agent only if the thermal crosslinking agent is copolymerized in such an amount that allows the thermal crosslinking agent to display the function thereof, and thus, an amount exceeding 0.1% by mass is required in order to display a remarkable crosslinking effect; consequently, in the present invention, the statement that "no thermal crosslinking agent is copolymerized" means that the copolymerized amount of the thermal crosslinking agent is 0.1% by mass or less.

Specific examples of such a thermal crosslinking agent include: epoxy groups such as glycidyl methacrylate and methylol methacrylate; melamine groups; methylolated compounds or methylmethylol compounds of these; and oxazoline group. When a thermal crosslinking agent is copolymerized with a vinylidene chloride copolymer, the thermal crosslinking reaction proceeds to a high extent, and consequently the elasticity of the coating layer is degraded to degrade the adhesion to the substrate film, in particular, the adhesion under the condition that the stress tends to be concentrated on the latex coating film serving as the coating layer as occurs at the time of the 180 degree peeling or as occurs under the condition of being bonded to a highly rigid heat sealing layer.

To the vinylidene chloride copolymer mixture, where needed, one or two or more of additives such as a pigment, an antioxidant, an antistatic agent, an ultraviolet absorber, a lubricant and a preservative agent may be added. Further, with the vinylidene chloride copolymer mixture, for example, for the purpose of bulking the mixture, the following fillers may be mixed: heavy or soft calcium carbonate, mica, talc, kaolin, gypsum, clay, barium sulfate, alumina powder, silica powder and magnesium carbonate. Appropriately, the mixing amounts of these additives are in a range from 0.001 to 2.0 parts by mass in terms of the total amount per 100 parts by mass of the vinylidene chloride copolymer mixture.

To the vinylidene chloride copolymer mixture, a surfactant may be added for the purpose of improving the coatability at the time of coating the substrate film with the latex. Such a surfactant promotes the wettability of the latex to the substrate film. Examples of such a surfactant may include: anionic surfactants such as polyethylene alkyl phenyl ether, polyoxyethylene-fatty acid ester, glycerin fatty acid ester, sorbitan fatty acid ester, fatty acid metal soaps, alkyl sulfuric acid salts, alkylsulfonic acid salts and alkylsulfosuccinic acid slats; and nonionic surfactants such as acetylene glycol. The addition amount of a surfactant is not particularly specified; however, in view of the coatability and adhesion to the substrate film, the addition amount of a surfactant is preferably such that the addition amount allows the surface tension of the latex to be regulated so as to fall in a range from 30 to 48 mN/m (the surface tension based on the 20° C. annular ring method with a du Nouy surface tensiometer). When the latex surface tension is less than 30 mN/m, the bubbling of the latex tends to be made vigorous, or the dispersion condition of the latex tends to be adversely affected. On the other hand, when the latex surface tension exceeds 48 mN/m, uniform application of the latex to the substrate film or uniform formation of the coating film tends to be difficult, and the adhesion to or the compatibility with the substrate film tends to be poor.

The solid content concentration of the vinylidene chloride copolymer mixture latex can be appropriately altered according to the specifications of the coating apparatus or the drying-heating apparatus. However, disadvantageously, a too dilute solution tends to take a long time in the drying step. On the other hand, when the latex concentration is too high, coating film formation proceeds to shorten the liquid pot life while the latex is being stored, or troubles tend to occur with respect to the coatability. From such viewpoints, the solid content concentration of the vinylidene chloride copolymer mixture latex is preferably in a range from 10 to 70% by mass and more preferably in a range from 30 to 55% by mass.

In the coated biaxially stretched film of the present invention, the thickness of the vinylidene chloride copolymer mixture layer is preferably 0.1 to 3.0 μm and more preferably 0.5 to 2.0 p.m. When the thickness is less than 0.1 μm, the gas-barrier property as an object of the present invention tends to be degraded, and when the thickness exceeds 3.0 μm, the film formability tends to be degraded to impair the exterior appearance of the coating film.

The inter-layer adhesive strength between the polyamide film and the vinylidene chloride copolymer mixture layer is preferably 2 N/cm or more both in the ordinary state and after a hot water treatment at 95° C. for 30 minutes. Such an inter-layer adhesive strength remarkably improves, for example, the resistantability after filling the content followed by sealing, the resistantability in the step of boiling sterilization and the resistance against the falling occurring in the step of distribution such as transportation, and thus the loss occurrence rate can be significantly improved. When the adhesive strength after the hot water treatment is less than 2 N/cm, the bag breaking due to the internal pressure in the boiling sterilization and the bag breaking due to the impact such as the falling occurring, for example, during transportation may occur. When the adhesive strength in the ordinary state is less than 2 N/cm, the bag breaking may occur due to the falling impact after filling the contents followed by sealing or due to the impact such as the falling occurring during transportation to a subsequent step.

A laminate can be formed from the polyamide film coated with the vinylidene chloride copolymer mixture of the present invention, by laminating an adhesive layer and a heat sealing layer in this order, on the vinylidene chloride copolymer mixture layer, directly or through the intermediary of a printing ink layer disposed in contact with the vinylidene chloride copolymer mixture layer. For the purpose of improving the adhesion between the vinylidene chloride copolymer mixture layer and the adhesive layer or the printing ink layer, a surface treatment such as a corona treatment or an ozone treatment may be performed.

The printing ink layer is a layer disposed for the purpose of forming letters, pictorial patterns and the like. Examples of the printing ink layer may include the layers formed with the inks constituted by adding to the ink binder resins having been used such as a urethane, acrylic, nitrocellulose, rubber and vinyl chloride ink binder resin, various additives such as various pigments, an extender pigment, a plasticizer, a drying agent and a stabilizer. Usable as the method for forming the printing ink layer are the well known printing methods such as offset printing, gravure printing and silk screen printing, and the well known coating methods such as roll coating, knife edge coating and gravure coating.

As the coating agent used in forming the adhesive layer, known coating agents can be used. Examples of the coating agent include isocyanate-based, polyurethane-based, polyester-based, polyethyleneimine-based, polybutadiene-based, polyolefin-based and alkyl titanate-based coating agents. In view of the effects of the adhesion, the heat resistance and the water resistance, preferable among these are the isocyanate-based, polyurethane-based and polyester-based coating agents. Specifically, preferable are one of isocyanate compounds, polyurethanes and urethane prepolymers, or mixtures of two or more of these compounds, and reaction products of these compounds; and mixtures and reaction products between isocyanate and one or two or more of polyesters, polyols and polyethers; and solutions and dispersions of these compounds, mixtures and reaction products. The thickness of the adhesive layer is preferably at least thicker than 0.1 μm for the purpose of sufficiently enhancing the adhesion to the heat sealing layer.

The heat sealing layer is disposed as the thermal adhesion layer when a packaging bag or the like is formed, and for this heat sealing layer, a material permitting heat sealing, high-frequency sealing or the like is used. Examples of such a material include low-density polyethylene, linear low-density polyethylene, high-density polyethylene, ethylene-vinyl acetate copolymer, polypropylene, ethylene-acrylic acid copolymer, ethylene-acrylic acid salt copolymer and ethylene-acrylate copolymer. The thickness of the heat sealing layer is determined according to the purpose, and is generally 15 to 200 μm.

Description is made on the method for producing the polyamide film coated with the vinylidene chloride copolymer mixture of the present invention.

In the production method of the present invention, the vinylidene chloride copolymer mixture latex is applied to the substrate film, at a stage which is an optional stage in the production process using an unstretched film and precedes the final performance of the biaxial stretching, or at a stage which is an optional stage in the production process using a uniaxially stretched film prepared by orienting an unstretched film in one direction of either the longitudinal direction or the transverse direction and precedes the final performance of the biaxial stretching.

Specifically, examples of the usable method include: a method in which after the vinylidene chloride copolymer mixture latex is applied to the substrate film, and the thus treated substrate film is as it is subjected simultaneously to the stretching treatment and the coating film forming treatment; and a method in which after the vinylidene chloride copolymer mixture latex is applied, the coated substrate film is subjected to a step in which the water in the vinylidene chloride copolymer mixture latex is evaporated for drying by blowing of hot air with a dryer or the like, by irradiation of infrared ray or by the like and thus the vinylidene chloride copolymer mixture latex is heat-fusion bonded, and then the coated substrate film is subjected simultaneously to the stretching treatment and the coating film forming treatment. From the viewpoint of the brushing resistance, preferable is the latter method which is capable of beforehand promoting the crystallization of the vinylidene chloride copolymer mixture latex before the stretching treatment.

The temperature of the water evaporation and drying step is preferably 70° C. to 150° C., and more preferably in a range from 80° C. to 120° C. in which the film formability of the polyvinylidene chloride copolymer mixture latex is satisfactory. When the drying temperature is lower than 70° C., the film formability is degraded, and when the drying temperature exceeds 150° C., the temperature increase in the latex is sharp to induce phenomena such as bumping and a uniform coating film is hardly obtained. The water evaporation and drying step may be divided into substeps different from each other in temperature. The time allotted to the treatment substep of the highest temperature among such substeps is optionally selected according to the items such as the thickness of the substrate film, the thickness of the vinylidene chloride copolymer mixture layer, the solid content amount of the latex and the specific heat of the latex. Usually, the allotted time is 0.01 to 120 seconds and preferably 1 to 80 seconds. When the allotted time is less than 0.01 second, the evaporativity of the water of the polyvinylidene chloride copolymer mixture latex tends to be poor, or the film formation of the polyvinylidene chloride copolymer mixture layer tends to be insufficient. When the allotted time exceeds 120 seconds, the crystallization of the polyamide resin tends to be accelerated excessively to preclude the stretched film production or the adhesion to the latex coating film tends to be disadvantageously affected as the case may be.

The method for applying the vinylidene chloride copolymer mixture latex to the substrate film is not particularly limited. Usable as such a method are common methods such as gravure roll coating, reverse roll coating, wire bar coating, air knife coating, die coating and curtain die coating.

For the purpose of maintaining the inter-layer adhesion between the biaxially stretched polyamide film and the vinylidene chloride copolymer mixture layer, the degree of crystallization of the substrate film immediately before the final stretching step, namely, the unstretched sheet in the simultaneous biaxial stretching method or the uniaxially stretched sheet in the successive biaxial stretching method, is preferably 30% or less, more preferably 25% or less and furthermore preferably 20% or less. When the degree of crystallization exceeds 30%, the degradation of the stretching workability or the film breaking due to the stretching stress increase tends to be caused, or the rigidification tends to cause the stress strain with the coating film of the vinylidene chloride copolymer to lead to degradation of the inter-layer adhesion.

As the method for regulating the degree of crystallization, known methods are used. For example, the following methods are used: a method involving the regulation of the cooling conditions in the solidification of the melt-extruded sheet; a method involving the control of the thickness of the air layer between the melt-extruded sheet and the cooling roll; a method involving the regulation of the temperature condition of the pass roll or the temperature conditions of the uniaxially stretching step; a method involving the regulation of the temperature conditions in the step of evaporating and drying the water contained in the vinylidene chloride copolymer latex; and a method involving the regulation of the sheet temperature in each of the steps through performing humidity control by passing the sheet through a water content regulation tank. Because of the capability of suppressing the degree of crystallization at a low level, preferable among these methods is a method in which the water content of the substrate film before the application of the vinylidene chloride copolymer mixture latex is controlled with a water content regulation tank, and thus the water content of the substrate film after passing through the evaporation step of the water in the latex, namely, immediately before the stretching step is regulated. In this case, the water content in the substrate film immediately before the stretching step is preferably 2 to 10% by mass and more preferably 4 to 8% by mass. When the water content is lower than 2% by mass, the stretching stress is increased and troubles such as film breaking tend to occur. On the other hand, when the water content is higher than 10% by mass, the thickness unevenness of the sheet is enhanced, and the thickness unevenness of the resulting stretched film is also increased.

As the biaxial stretching orientation method of a polyamide film, for example, the simultaneous biaxial stretching method and the successive biaxial stretching method are adopted. Among these, the simultaneous biaxial stretching method is particularly preferable because this method is capable of suppressing to a lower level the degree of crystallization of a thermoplastic resin sheet immediately before the final stretching step. Examples of the simultaneous biaxial stretching method include a method in which an unstretched sheet is oriented by simultaneously stretching the unstretched sheet in the machine direction and the widthwise direction of the sheet at a stretching temperature of usually 70 to 250° C. and preferably 100 to 230° C. When the unstretched sheet regulated to have the water content falling in the above-described range is used, the stretching temperature falling in a range from 170 to 230° C. in which the sheet is sharply increased in temperature to be softened on completion of the water evaporation is more preferable because such a temperature enables a stretching operation while the progress of the crystallization of the sheet is being suppressed. In terms of the area magnification factor, the stretching magnification factor is preferably 4 to 50, more preferably 7 to 35 and particularly preferably 10 to 20.

In the successive biaxial stretching, first, as a first stage stretching, an unstretched polyamide resin sheet is stretched in one direction, with a roll-type or tenter-type stretching machine. The stretching temperature in this stretching is preferably 70 to 150° C. and more preferably 80 to 120° C. The stretching magnification factor in this stretching is preferably 2.5 to 6 and more preferably 2.5 to 3.5. When the stretching temperature or the stretching magnification factor is too high, the degree of crystallization of the uniaxially stretched sheet comes to be too high. Next, as a second stage stretching, a stretching is performed in the direction perpendicular to the first stage stretching direction. The stretching temperature in this stretching is preferably 70 to 150° C. and particularly preferably 80 to 120° C. The stretching magnification factor in this stretching is preferably 3.0 to 7 and particularly preferably 3.5 to 6.

In the above-described successive biaxial stretching, the stretching in one direction is performed as divided into two or more stages. In such a case, it is preferable to perform the successive biaxial stretching in such a way that the final stretching magnification factors of the two directions respectively fall in the above-described ranges. Additionally, where needed, before or after performing heat treatment, stretching may be performed again in either one direction and/or the direction perpendicular thereto.

The biaxially stretched film, obtained by finally biaxially stretching a polyamide film having been coated with the vinylidene chloride copolymer mixture, is successively subjected to a heat fixation treatment under a tension or under a relaxation of within 30%, preferably at 150 to 250° C., more preferably at 170 to 230° C. and furthermore preferably at 190 to 230° C. In this case, when the highest temperature of the heat fixation treatment step is lower than 150° C., due to fact that the thermal dimensional stability of the stretch-oriented film is made poor, or due to the fact that the melt fusion bonding property of the vinylidene chloride copolymer mixture layer is made poor, the gas-barrier property tends to be degraded or the adhesion to the substrate film tends to be degraded. On the other hand, when the highest temperature of the heat fixation treatment step exceeds 250° C., the temperature of the polyamide resin is made higher than the melting point thereof as the case may be and hence the stretched film production tends to be precluded, or all the crystal nuclei of the vinylidene chloride copolymer mixture are melted and hence the brushing resistance effect tends to be made poor.

The heat fixation treatment step may be divided into substeps different from each other in temperature. The time allotted to the treatment substep of the highest temperature among such substeps is optionally selected according to the thickness and the specific heat of the substrate film, and the thickness and the specific heat of the vinylidene chloride copolymer mixture layer. The allotted time is preferably 0.01 to 30 seconds and more preferably 1 to 20 seconds. When the allotted time is less than 0.01 second, due to the fact that the thermal dimensional stability of the stretch-oriented film is made poor, or due to the fact that the vinylidene chloride copolymer mixture layer serving as a heated medium does not reach a predetermined temperature and hence the melt fusion bonding property of the vinylidene chloride copolymer mixture layer is made poor, the gas-barrier property tends to be degraded or the adhesion to the substrate film tends to be degraded. On the other hand, when the allotted time exceeds 30 seconds, the temperature of the polyamide resin is made higher than the melting point thereof as the case may be and hence the stretched film production tends to be precluded, or all the crystal nuclei of the vinylidene chloride copolymer mixture are melted and hence brushing resistance tends to be made poor.

The thus resulting biaxially stretched polyamide film coated with the vinylidene chloride copolymer mixture is made to pass through a cooling zone, and then continuously wound up with a winder. In this case, under the condition that the surface temperature exceeds the crystal melting point, the production amount of the recrystallization nuclei in the vinylidene chloride copolymer mixture layer is small and hence the brushing resistance effect tends to be made poor. Accordingly, the surface temperature of the vinylidene chloride copolymer mixture layer is preferably equal to or lower than the crystal melting point of the vinylidene chloride copolymer that has a crystal melting point of 170° C. or higher and 210° C. or lower. From the viewpoint of the damage to the machine or the like and from the viewpoint of the safety, the surface temperature is more preferably in a range from 20 to 150° C. and particularly preferably in a range from 20 to 100° C.

For the purpose of preventing from being almost melted the crystal nuclei of the vinylidene chloride copolymer latex formed by a vinylidene chloride copolymer having a high crystal melting point, the highest heat treatment temperature in the film stretching production step is preferably set in a range of [(the crystal melting point of the vinylidene chloride copolymer)+50° C.] or lower. The highest heat treatment temperature in the film stretching production step is generally the temperature of the heat fixation treatment. The temperature difference between the heat fixation treatment temperature and the crystal melting point of the vinylidene chloride copolymer exceeds 50° C., the film tends to be broken during the stretching step, or the brushing resistance tends to be degraded even when a film is obtained.

The method for forming the above-described adhesive layer is not particularly limited, and usable are the common methods such as gravure roll coating, reverse roll coating, wire bar coating and air knife coating.

As the method for forming the above-described heat sealing layer, known methods are used. Examples of such a method include: lamination methods such as a dry lamination method, a wet lamination method, a solvent-free dry lamination method and an extrusion lamination method; a coextrusion method in which two or more resin layers are extruded simultaneously to be laminated with each other; and a coating method in which a film is produced by using a coater or the like. In consideration of the adhesiveness, the heat resistance, the water resistance and the like, preferable among these is the dry lamination method.

The polyamide film coated with the vinylidene chloride copolymer mixture of the present invention is excellent in workability, and the coating film formed of the vinylidene chloride copolymer mixture is excellent in the adhesion to the substrate film, the brushing resistance, the gas-barrier property and the boiling heat-treatment resistance, and hence the polyamide film coated with the vinylidene chloride copolymer mixture of the present invention can be preferably used as packaging materials, electrical insulating materials, general industrial materials and others.

EXAMPLES

Hereinafter, the present invention is described in detail with reference to Examples. The measurement methods of various physical properties, the production methods and the evaluation methods of the effects in following Examples and Comparative Examples are as follows. It is to be noted that the present invention is not limited only to these Examples.

(1) Water Content of Polyamide Film

A sample was sampled from a polyamide film, the sample was placed in a weighing bottle and dried, and thus, the water content of the polyamide film was calculated from the mass variation between before and after drying. It is to be noted that when a vinylidene chloride copolymer mixture layer was formed on the polyamide film, this layer was wiped off with absorbent cotton impregnated with tetrahydrofuran (THF), and then the film was subjected to the evaluation.

(2) Degree of Crystallization

A sample was sampled from a polyamide film, the sample was cut into specimens of a size of about 5×5 mm, the thus obtained specimens were each placed in one of the concentration gradient tubes prepared with n-heptane and carbon tetrachloride in a constant-temperature water tank controlled at 25° C., and then the read out density d after 24 hours elapsed from the placement of the specimens was measured. By using the amorphous density of nylon 6 of 1.10 and the crystalline density of nylon 6 of 1.23, the degree of crystallization was calculated on the basis of the following formula.

Degree of crystallization (%)=($d$−1.10)/(1.23−1.10)×100

It is to be noted that when a vinylidene chloride copolymer mixture layer was formed on a polyamide film, this layer was wiped off with absorbent cotton impregnated with THF, and then the film was subjected to the evaluation.

(3) Crystal Melting Point of Vinylidene Chloride Copolymer

By using a differential scanning calorimeter (DSC, DSC-60 manufactured by Perkin-Elmer Corp.), the crystal melting point was obtained from the top of the endothermic peak in the chart obtained when 2 mg of a dried coating film of a vinylidene chloride copolymer latex was heated from room temperature to 230° C. at a constant rate (10° C./min).

(4) Adhesion Between Substrate Film and Vinylidene Chloride Copolymer Mixture Layer The evaluation of the adhesion between a polyamide film as the substrate film and a vinylidene chloride copolymer mixture layer was performed with a sample prepared by the following method. First, a dry laminating adhesive (Dic Dry LX401S/SP60, manufactured by DIC Corp.) for use in general and boiling applications was applied with a gravure roll to the surface of the vinylidene chloride copolymer mixture layer in the sample film in such a way that the applied amount of the adhesive in dryness was 3.0 g/m$^2$, and then heat treated at 80° C. On the surface of the vinylidene chloride copolymer mixture layer of the thus heat treated film, an unstretched polypropylene film (RXC-21, 50 μm, manufactured by Tohcello Co., Ltd.) was dry laminated on a metal roll heated to 80° C. by applying a nip pressure of 490 kPa. Further, the aging recommended for the adhesive used was performed to yield a laminated film.

For the measurement of the adhesion, namely, the adhesive strength between the biaxially stretched polyamide film and the vinylidene chloride copolymer mixture layer, a specimen of 15 mm in width was sampled from the laminated film. In an atmosphere of 20° C. and 65% RH, at the edge of the specimen, the interface between the polypropylene film and the polyamide film coated with the vinylidene chloride copolymer mixture, namely, the interface between the polypropylene film and the vinylidene chloride copolymer mixture layer was peeled off. Then, with a tensile tester (AGS-100G, manufactured by Shimadzu Corp.) at a tensile speed of 300 mm/min, measured was the laminate strength for the mutual T-shaped arrangement of the polypropylene film and the polyamide film coated with the vinylidene chloride copolymer mixture.

In this way, the peeling occurred in the interface between the vinylidene chloride copolymer mixture layer dry-laminated with the polypropylene film and the polyamide film, or the peeling occurred in the interface between the polypropylene film and the vinylidene chloride copolymer mixture layer. In such a case, when in the sample after the laminate strength measurement, no peeling occurred in the inter-layer position between the polyamide film as the substrate film and the vinylidene chloride copolymer mixture layer, the inter-layer peel strength between the substrate film and the vinylidene chloride copolymer mixture layer can be assumed to have a value at least equal to or larger than the above-described measured value.

Additionally, this laminated film was subjected to an immersion treatment for 30 minutes in a hot water treatment tank regulated at 95° C., and then subjected to a laminate strength measurement in the same manner as described above, and thus the peel strength after the boiling treatment was evaluated.

On the basis of the evaluation results, the grading was made as follows.

A: 3 N/cm or more, or the elongation of the sealant film or the breaking of the substrate film occurs to preclude the peeling at the interface involving the vinylidene chloride copolymer layer.

B: 2.5 N/cm or more and less than 3 N/cm

C, 2.0 N/cm or more and less than 2.5 N/cm

D: Less than 2.0 N/cm

Although the strength of 2 N/cm or more permits practical use of the concerned film without problems, the strength is more preferably 2.5 N/cm or more and most preferably 3 N/cm or more.

(5) Gas-Barrier Property

The oxygen gas-barrier property was evaluated as follows by measuring the oxygen permeability of a coated biaxially stretched film in an atmosphere of a temperature of 20° C. and a relative humidity of 85% by using an oxygen barrier tester (OX-TRAN 2/20) manufactured by Mocon, Inc.

A: Less than 70 ml/m$^2$·d·MPa

B: 70 ml/m$^2$·d·MPa or more and less than 90 ml/m$^2$·d·MPa

C: 90 ml/m$^2$·d·MPa or more and less than 110 ml/m$^2$·d·MPa

D: 110 ml/m$^2$·d·MPa or more

Although the oxygen permeability of less than 110 ml/m$^2$·d·MPa permits practical use of the concerned film without problems, the oxygen permeability is more preferably less than 90 ml/m$^2$·d·MPa and most preferably less than 70 ml/m$^2$·d·MPa.

(6) Evaluation of Brushing Resistance

Two sheets of polyamide films each coated with a vinylidene chloride copolymer mixture, immediately after passing through the cooling zone after the heat fixation treatment, were used, and the vinylidene chloride copolymer mixture layers of these polyamide films were superposed with each other and subjected to a pressure bonding treatment under a load of 30 kg/10×10 cm$^2$ at 40° C. for 24 hours, to form a superposed film. Then, an edge of the superposed film was peeled into two edges for peeling, and by using a tensile tester (AGS-100G, manufactured by Shimadzu Corp.) at a tensile speed of 100 mm/min, the two films of the superposed film were peeled off from each other by pulling under the condition that one film and the other film of the superposed film mutually form a T-shape arrangement. Thus, the strength at the time of peeling and the visually-inspected exterior appearance of the films after peeling were evaluated as follows.

A: The peel strength is less than 100 g/10 cm, and no abnormality is observed in the exterior appearance of the films after peeling.

B: The peel strength is 100 g/10 cm or more and less than 150 g/10 cm, and no abnormality is observed in the exterior appearance of the films after peeling.

C: The peel strength is 150 g/10 cm or more and less than 200 g/10 cm, and slight whitening is observed in a very small part in the exterior appearance of the films after peeling.

D: The peel strength is 200 g/10 cm or more, and definite whitening is observed almost over the whole surface of the exterior appearance of the films after peeling, or the film breaking occurs to preclude the peeling.

Although the condition C permits practical use of the concerned film without problems, the condition B is more preferable and the condition A is most preferable. The condition D does not permit practical use of the concerned film.

The methods producing various samples are as follows.

[Vinylidene Chloride Copolymer Latexes]

(A-1)

Under the conditions at room temperature, in a glass-lined pressure-tight reaction vessel, 85 parts by mass of water, 0.15 part by mass of sodium alkylsulfonate and 0.10 part by mass of sodium persulfate were placed and degassed, and then the temperature of the contents was maintained at 55° C. In another vessel, 97 parts by mass of vinylidene chloride, 2 parts by mass of methyl acrylate and 1 part by mass of acrylic acid were mixed after metering to prepare a monomer mixture. In the above-described reaction vessel, 10 parts by mass of the monomer mixture was fed, and the reaction of the mixture was allowed to proceed under stirring. After making sure, from the decrease of the pressure inside the reaction vessel, that the reaction proceeded almost completely, 10 parts by mass of a 15% by mass aqueous solution of sodium alkylsulfonate was pressed into the reaction vessel, and subsequently all the rest of the monomer mixture was continuously added by metering into the reaction vessel over 15 hours. Thus, a latex was obtained, and to the latex thus obtained, the 15% by mass aqueous solution of sodium alkylsulfonate was added in such a way that the liquid surface tension at 20° C. reached 42 mN/m. It is to be noted that the polymerization yield of this case was 99.9%. Therefore, the composition of the obtained vinylidene chloride copolymer latex was found to be approximately equivalent to the component proportions of the fed starting materials. The solid content concentration of the latex was 51% by mass. The crystal melting point was found to be 190° C. by the DSC measurement of the crystal melting point.

(A-2)

The mixing amounts in the above-described other vessel were altered to 96.2 parts by mass of vinylidene chloride, 2.3 parts by mass of methyl acrylate and 1.5 parts by mass of acrylic acid. Otherwise in the same manner as described above, a vinylidene chloride copolymer latex was obtained. The solid content concentration of the latex was 51% by mass. The crystal melting point was found to be 180° C. by the DSC measurement of the crystal melting point.

(A-3)

The mixing amounts in the above-described other vessel were altered to 95 parts by mass of vinylidene chloride, 3 parts by mass of methyl acrylate and 2 parts by mass of acrylic acid. Otherwise in the same manner as described above, a vinylidene chloride copolymer latex was obtained. The solid content concentration of the latex was 51% by mass. The crystal melting point was found to be 170° C. by the DSC measurement of the crystal melting point.

(A-4)

the mixing amounts in the above-described other vessel were altered to 98.9 parts by mass of vinylidene chloride, 0.6 part by mass of methyl acrylate and 0.5 part by mass of acrylic acid. Otherwise in the same manner as described above, a vinylidene chloride copolymer latex was obtained. The solid content concentration of the latex was 51% by mass. The crystal melting point was found to be 210° C. by the DSC measurement of the crystal melting point.

(A-5)

The mixing amounts in the above-described other vessel were altered to 94.5 parts by mass of vinylidene chloride, 3.5 parts by mass of methyl acrylate and 2.0 parts by mass of acrylic acid. Otherwise in the same manner as described above, a vinylidene chloride copolymer latex was obtained. The solid content concentration of the latex was 51% by mass. The crystal melting point was found to be 166° C. by the DSC measurement of the crystal melting point.

(A-6)

The mixing amounts in the above-described other vessel were altered to 99.5 parts by mass of vinylidene chloride and 0.5 part by mass of acrylic acid. Otherwise in the same manner as described above, a vinylidene chloride copolymer latex was obtained. The solid content concentration of the latex was 51% by mass. The crystal melting point was found to be 213° C. by the DSC measurement of the crystal melting point.

(B-1)

The mixing amounts in the above-described other vessel were altered to 90 parts by mass of vinylidene chloride, 9 parts by mass of methyl acrylate and 1 part by mass of acrylic acid. Otherwise in the same manner as described above, a vinylidene chloride copolymer latex was obtained. The solid content concentration of the latex was 51% by mass. The crystal melting point was found to be 140° C. by the DSC measurement of the crystal melting point.

(B-2)

The mixing amounts in the above-described other vessel were altered to 86 parts by mass of vinylidene chloride, 13 parts by mass of methyl acrylate and 1 part by mass of acrylic acid. Otherwise in the same manner as described above, a vinylidene chloride copolymer latex was obtained. The solid content concentration of the latex was 51% by mass. The crystal melting point was found to be 120° C. by the DSC measurement of the crystal melting point.

(C-1)

The mixing amounts in the above-described other vessel were altered to 90 parts by mass of vinylidene chloride, 6 parts by mass of methyl acrylate, 1 part by mass of acrylic acid and 3 parts by mass of glycidyl methacrylate. Otherwise in the same manner as described above, a vinylidene chloride copolymer latex was obtained. The solid content concentration of the latex was 52.5% by mass. In the vinylidene chloride copolymer latex, 3 parts by mass of an epoxy-based thermal crosslinking agent was copolymerized. The crystal melting point was found to be 142° C. by the DSC measurement of the crystal melting point.

Table 1 shows the starting material compositions and the crystal melting points of the vinylidene chloride copolymers of the above-described vinylidene chloride copolymer latexes (A-1) to (C-1).

TABLE 1

| Latex type | Starting material composition (parts by mass) | | | | Crystal melting point (° C.) of vinylidene chloride copolymer |
|---|---|---|---|---|---|
| | Vinylidene chloride | Methyl acrylate | Acrylic acid | Glycidyl methacrylate | |
| A-1 | 97 | 2 | 1 | — | 190 |
| A-2 | 96.2 | 2.3 | 1.5 | — | 180 |

TABLE 1-continued

| Latex type | Starting material composition (parts by mass) | | | | Crystal melting point (° C.) of vinylidene chloride copolymer |
|---|---|---|---|---|---|
| | Vinylidene chloride | Methyl acrylate | Acrylic acid | Glycidyl methacrylate | |
| A-3 | 95 | 3 | 2 | — | 170 |
| A-4 | 98.9 | 0.6 | 0.5 | — | 210 |
| A-5 | 94.5 | 3.5 | 2 | — | 166 |
| A-6 | 99.5 | — | 0.5 | — | 213 |
| B-1 | 90 | 9 | 1 | — | 140 |
| B-2 | 86 | 13 | 1 | — | 120 |
| C-1 | 90 | 6 | 1 | 3 | 142 |

Example 1

The latexes A-1 and B-1 were mixed together under stirring to yield a mixed latex. Here, the vinylidene chloride copolymer amount of A-1 was regulated to be 25 parts by mass in relation to 100 parts by mass of the total amount of the vinylidene chloride copolymers contained in the mixed latex.

On the other hand, nylon 6 chips were placed in an extruder and melted in a cylinder heated to 270° C., extruded from a T-die orifice into a sheet shape, and rapidly cooled by bringing into contact with a rotary drum cooled to 10° C. to yield a 150-μm thick unstretched nylon 6 film. The unstretched film was guided into a water content regulation tank and made to have a water content of 7.0% by mass.

Next, the above-described mixed latex was applied by an air knife coating method to the untreated surface of the unstretched nylon 6 film, and was subjected to a drying treatment for 30 seconds with an infrared irradiator set at a temperature of 110° C. to evaporate the water in the latex for drying the latex. In this case, the water content and the degree of crystallization of the unstretched sheet were found to be 5.0% by mass and 15.6%, respectively.

The film coated with the latex was guided into a simultaneous biaxial stretching machine set at a temperature of 220° C. and subjected to a simultaneous biaxial stretching with a longitudinal magnification factor of 3.3 and a transverse magnification factor of 3.0. Successively, at a temperature of 220° C., the film was subjected to a hot air fixation treatment for 5 seconds and a 5% transverse relaxation treatment, then cooled to a film surface temperature of 40° C., to yield a polyamide film coated with a vinylidene chloride copolymer mixture, having a nylon 6 film thickness of 15 μm and a coating thickness of 1.2 μm.

For the obtained film, the gas-barrier property, the brushing resistance and the adhesion between the substrate film and the vinylidene chloride copolymer mixture layer were evaluated. The results thus obtained are shown in Table 2.

Examples 2 to 13

In each of Examples 2 to 13, the type and the resin proportion of the vinylidene chloride copolymer latex to be used and the hot air fixation treatment temperature were altered as described in Table 2, and otherwise in the same manner as in Example 1, a polyamide film coated with a vinylidene chloride copolymer mixture was obtained. For each of the thus obtained films, the gas-barrier property, the brushing resistance and the adhesion between the substrate film and the vinylidene chloride copolymer mixture layer were evaluated. The results thus obtained are shown in Table 2.

Example 14

To the surface of the coating film of the vinylidene chloride copolymer mixture in the polyamide film coated with a vinylidene chloride copolymer mixture, obtained in Example 1, a one-part type urethane-based laminate ink (Fine Star R631 white, manufactured by Toyo Ink Manufacturing Co., Ltd.) was applied with a gravure roll in such a way that the applied amount of the laminate ink in dryness was 1.0 g/m², and then heat treated at 60° C. Otherwise in the same manner as in Example 1, a polyamide film coated with a vinylidene chloride copolymer mixture was obtained. For the obtained film, the gas-barrier property, the brushing resistance and the adhesion between the substrate film and the vinylidene chloride copolymer mixture layer were evaluated. The results thus obtained are shown in Table 2.

Example 15

The conditions of the water content regulation tank for treating an unstretched film were regulated, and thus, the water content of an unstretched nylon 6 film before the mixed latex coating was set at 6.2% by mass, and the water content and the degree of crystallization of the unstretched sheet after the mixed latex coating was set at 4.7% by mass and 19.9%, respectively. Otherwise in the same manner as in Example 1, a polyamide film coated with a vinylidene chloride copolymer mixture was obtained. For the obtained film, the gas-barrier property, the brushing resistance and the adhesion between the substrate film and the vinylidene chloride copolymer mixture layer were evaluated. The results thus obtained are shown in Table 2.

Example 16

The conditions of the water content regulation tank for treating an unstretched film were regulated, and thus, the water content of an unstretched nylon 6 film before the mixed latex coating was set at 5.1% by mass, and the water content and the degree of crystallization of the unstretched sheet after the mixed latex coating was set at 3.7% by mass and 23.1%, respectively. Otherwise in the same manner as in Example 1, a polyamide film coated with a vinylidene chloride copolymer mixture was obtained. For the obtained film, the gas-barrier property, the brushing resistance and the adhesion between the substrate film and the vinylidene chloride copolymer mixture layer were evaluated. The results thus obtained are shown in Table 2.

Example 17

Nylon 6 chips were placed in an extruder, melted in a cylinder heated to 270° C., extruded from a T-die orifice into a sheet shape, and rapidly cooled by bringing into contact with a rotary drum cooled to 10° C. Thus, a 150-μm thick unstretched nylon 6 film was obtained.

Successively, the film was longitudinally stretched with a magnification factor of 2.7, with a longitudinal stretching machine equipped with a group of rollers different in circumferential velocity from each other and set at a roller temperature of 55° C. The mixed latex prepared in Example 1 was applied by an air knife coating method to the untreated surface of the longitudinally uniaxially stretched film, and subjected to a drying treatment for 30 seconds with an infrared irradiator set at a temperature of 110° C. to evaporate the water in the latex for drying the latex. The water content and the degree of crystallization of the unstretched sheet were found to be 0.1% by mass and 25.0%, respectively.

Subsequently, the thus treated film was guided into a transverse stretching machine set at a temperature of 90° C. and subjected to a transverse stretching with a magnification factor of 3.8. In other words, the film was subjected to a successive biaxial stretching.

Successively, at a temperature of 220° C. and for 5 seconds, the film was subjected to a hot air fixation treatment and a 5% transverse relaxation treatment, and then subjected to a cooling treatment to a film surface temperature of 40° C., to yield a polyamide film coated with a vinylidene chloride copolymer mixture, having a nylon 6 film thickness of 15 μm and a coating thickness of 1.2 μm.

For the obtained film, the gas-barrier property, the brushing resistance and the adhesion between the substrate film and the vinylidene chloride copolymer mixture layer were evaluated. The results thus obtained are shown in Table 2.

Comparative Examples 1 to 7

In each of Comparative Examples 1 to 7, the type and the resin proportion of the vinylidene chloride copolymer latex to be used and the hot air fixation treatment temperature were altered as described in Table 2, and otherwise in the same manner as in Example 1, a polyamide film coated with a vinylidene chloride copolymer mixture was obtained. It is to be noted that in Comparative Example 5, the heat fixation treatment temperature had a temperature difference exceeding 50° C. with respect to the crystal melting point of the vinylidene chloride copolymer having a crystal melting point of 170° C. or higher and 210° C. or lower, and hence breaking occurred during the film stretching step to preclude sampling.

For each of the thus obtained films, the gas-barrier property, the brushing resistance and the adhesion between the substrate film and the vinylidene chloride copolymer mixture layer were evaluated. The results thus obtained are shown in Table 2.

TABLE 2

| | Composition of mixed latex | | Heat fixation treatment temperature | | Brushing resistance | | |
|---|---|---|---|---|---|---|---|
| | Type and amount* (parts by mass) | Type | Temperature (° C.) | ΔT** | Evaluation | Peel strength (g/10 cm) | Exterior appearance |
| Ex. 1 | A-1 25 | B-1 | 220 | 30 | B | 110 | Not abnormal |
| Ex. 2 | A-1 35 | B-1 | 220 | 30 | A | 25 | Not abnormal |
| Ex. 3 | A-1 45 | B-1 | 220 | 30 | A | 10 | Not abnormal |
| Ex. 4 | A-2 35 | B-1 | 220 | 40 | A | 60 | Not abnormal |
| Ex. 5 | A-3 25 | B-1 | 220 | 50 | C | 180 | Partially whitened |
| Ex. 6 | A-4 45 | B-1 | 220 | 10 | A | 10 | Not abnormal |
| Ex. 7 | A-4 45 | B-1 | 200 | −10 | A | 10 | Not abnormal |
| Ex. 8 | A-3 45 | B-1 | 190 | 20 | A | 50 | Not abnormal |
| Ex. 9 | A-2 25 | B-1 | 230 | 50 | B | 120 | Not abnormal |
| Ex. 10 | A-1 25 | B-2 | 220 | 30 | B | 110 | Not abnormal |
| Ex. 11 | A-2 25 | B-2 | 230 | 50 | B | 130 | Not abnormal |
| Ex. 12 | A-3 25 | B-2 | 220 | 50 | C | 190 | Partially whitened |
| Ex. 13 | A-4 45 | B-2 | 220 | 10 | A | 10 | Not abnormal |
| Ex. 14 | A-1 25 | B-2 | 220 | 30 | — | — | — |
| Ex. 15 | A-1 25 | B-2 | 220 | 30 | B | 110 | Not abnormal |
| Ex. 16 | A-1 25 | B-2 | 220 | 30 | B | 105 | Not abnormal |
| Ex. 17 | A-1 25 | B-2 | 220 | 30 | B | 120 | Not abnormal |
| Com. Ex. 1 | A-1 20 | B-1 | 220 | 30 | D | 220 | Whitened |
| Com. Ex. 2 | A-1 50 | B-1 | 220 | 30 | A | 10 | Not abnormal |
| Com. Ex. 3 | A-5 45 | B-1 | 210 | 44 | D | 340 | Whitened |
| Com. Ex. 4 | A-6 25 | B-1 | 220 | 7 | A | 10 | Not abnormal |
| Com. Ex. 5 | A-2 45 | B-1 | 235 | 55 | — | — | — |
| Com. Ex. 6 | — 0 | C-1 | 220 | — | A | 15 | Not abnormal |
| Com. Ex. 7 | A-1 25 | C-1 | 220 | 30 | A | 25 | Not abnormal |

| | Adhesion to substrate film (ordinary state) | | Adhesion to substrate film (after boiling) | | Gas-barrier property Oxygen | |
|---|---|---|---|---|---|---|
| | Evaluation | Adhesive strength (N/cm) | Evaluation | Adhesive strength (N/cm) | Evaluation | permeability (ml/m² · d · MPa) |
| Ex. 1 | A | 3.2 (CP elongation) | A | 3.3 (CP elongation) | A | 65 |
| Ex. 2 | A | 3.3 (CP elongation) | A | 3.4 (CP elongation) | A | 68 |
| Ex. 3 | B | 2.9 | B | 2.7 | B | 73 |
| Ex. 4 | A | 3.2 (CP elongation) | A | 3.3 (CP elongation) | A | 61 |
| Ex. 5 | A | 3.2 (CP elongation) | A | 3.3 (CP elongation) | A | 53 |
| Ex. 6 | B | 2.5 | C | 2.3 | C | 95 |
| Ex. 7 | C | 2.1 | C | 2.0 | C | 108 |
| Ex. 8 | A | 3.0 | B | 2.6 | C | 94 |
| Ex. 9 | A | 3.3 (CP elongation) | A | 3.4 (CP elongation) | A | 66 |
| Ex. 10 | A | 3.3 (CP elongation) | A | 3.4 (CP elongation) | A | 68 |
| Ex. 11 | A | 3.3 (CP elongation) | A | 3.4 (CP elongation) | A | 58 |
| Ex. 12 | A | 3.4 (CP elongation) | A | 3.4 (CP elongation) | A | 55 |
| Ex. 13 | B | 2.7 | C | 2.4 | C | 95 |
| Ex. 14 | A | 3.2 (CP elongation) | A | 3.2 (CP elongation) | — | — |
| Ex. 15 | A | 3.2 (CP elongation) | A | 3.2 (CP elongation) | A | 65 |
| Ex. 16 | A | 3.0 | A | 3.2 (CP elongation) | A | 63 |
| Ex. 17 | B | 2.5 | A | 3.1 (CP elongation) | B | 70 |

TABLE 2-continued

| | | | | | | |
|---|---|---|---|---|---|---|
| Com. Ex. 1 | A | 3.2 (CP elongation) | A | 3.3 (CP elongation) | A | 60 |
| Com. Ex. 2 | D | 1.8 | D | 1.4 | D | 160 |
| Com. Ex. 3 | A | 3.3 (CP elongation) | B | 2.6 | B | 72 |
| Com. Ex. 4 | D | 1.2 | B | 2.7 | D | 130 |
| Com. Ex. 5 | — | — | — | — | — | — |
| Com. Ex. 6 | D | 0.5 | D | 1.9 | B | 88 |
| Com. Ex. 7 | D | 0.7 | D | 1.8 | B | 85 |

*The amount of the latex resin component high in crystal melting point, in the mixed latex, in relation to 100 parts by mass of the total resin components
**ΔT = Heat fixation treatment temperature − crystal melting point of the vinylidene chloride copolymer high in crystal melting point
The (CP elongation) in the adhesive strength indicates that the inter-layer peel strength is larger than the elastic force of the sealant film and the actual adhesive strength is equal to or larger than the value listed as the measured value in the table. No remark of (CP elongation) indicates the occurrence of the peeling in the interface between the substrate film and the vinylidene chloride copolymer layer.

Examples 1 to 13 and 15 each resulted in an excellent film involving no problems with respect to the brushing resistance, the adhesion between the substrate film and the vinylidene chloride copolymer mixture layer and the gas-barrier property. Example 14 also resulted in a satisfactory adhesion.

It is to be noted that in each of Examples 1 to 13 and 15, at the time of the adhesion evaluation, there was obtained a laminate in which an adhesive layer and a heat sealing layer were laminated in this order directly on the vinylidene chloride copolymer mixture layer, and the laminate was found to be suitable for producing a bag or the like by heat sealing.

In Example 14, at the time of the adhesion evaluation, there was obtained a laminate in which an adhesive layer and a heat sealing layer were laminated in this order through the intermediary of a printing ink layer disposed in contact with the vinylidene chloride copolymer mixture layer, and the laminate was also found to be suitable for producing a bag or the like by heat sealing.

On the other hand, Comparative Example 1 was disadvantageous with respect to the brushing resistance because the mixing proportion of the vinylidene chloride copolymer having a crystal melting point of 170° C. or higher and 210° C. or lower was smaller than the range specified in the present invention.

Comparative Example 2 was poor in the adhesion between the substrate film and the vinylidene chloride copolymer mixture layer and also insufficient in the gas-barrier property because the mixing proportion of the vinylidene chloride copolymer having a crystal melting point of 170° C. or higher and 210° C. or lower was larger than the range specified in the present invention.

Comparative Example 3 was poor in the brushing resistance because the crystal melting point of the vinylidene chloride copolymer having a high crystal melting point was lower than the range specified in the present invention.

Comparative Example 4 was poor in the adhesion in the ordinary state between the substrate film and the vinylidene chloride copolymer mixture layer and also insufficient in the gas-barrier property because the crystal melting point of the vinylidene chloride copolymer having a high crystal melting point was higher than the range specified in the present invention.

Comparative Examples 6 and 7 each resulted in a poor adhesion between the substrate film and the vinylidene chloride copolymer mixture layer because a latex copolymerized with a thermal crosslinking agent was used as the latex.

The invention claimed is:

1. A method for producing a nylon 6 film coated with a vinylidene chloride copolymer mixture, comprising:
    coating an unstretched nylon 6 film with a latex of a vinylidene chloride copolymer mixture without a primer layer;
    regulating a water content of the unstretched nylon 6 film to be 2 to 10% by mass and a degree of crystallization of the unstretched nylon 6 film to be 15.6 to 30%; and
    biaxially stretching the nylon 6 film, wherein
    the vinylidene Chloride copolymer mixture comprises two or more vinylidene chloride copolymers having no thermal crosslinking agent copolymerized therewith,
    one of the vinylidene chloride copolymers has a proportion of vinylidene chloride falling in a range of 95 to 99% by mass, exhibits the highest crystal melting point among the vinylidene chloride copolymers, has a crystal melting point of not lower than 170° C. and not higher than 210° C., and is contained in an amount of 25 to 45 parts by mass in relation to 100 parts by mass of the vinylidene chloride copolymer mixture, and
    another of the vinylidene chloride copolymers has a proportion of vinylidene chloride falling in a range of 80 to 95% by mass.

* * * * *